United States Patent [19]

Holzapfel

[11] 4,299,484
[45] Nov. 10, 1981

[54] RANGE AND SPEED MEASURING EQUIPMENT WITH NOISE FREQUENCY MODULATED TRANSMITTER

[75] Inventor: Wolfgang Holzapfel, Bruchkoebel, Fed. Rep. of Germany

[73] Assignee: Honeywell GmbH, Offenbach, Fed. Rep. of Germany

[21] Appl. No.: 62,847

[22] Filed: Aug. 1, 1979

[30] Foreign Application Priority Data

Aug. 10, 1978 [DE] Fed. Rep. of Germany ....... 2834954

[51] Int. Cl.³ .......................... G01C 3/08; G01C 3/36
[52] U.S. Cl. .................................. 356/28.5; 356/28.5; 364/819
[58] Field of Search ........................... 356/5, 28, 28.5; 343/17.2 R, 17.5; 364/565, 819

[56] References Cited

U.S. PATENT DOCUMENTS

| | | | |
|---|---|---|---|
| 3,586,997 | 6/1971 | Kinsel | 332/7.51 |
| 3,705,297 | 12/1972 | John | 364/602 |
| 3,731,103 | 5/1973 | Omeara | 356/5 |
| 3,733,129 | 5/1973 | Brides | 356/5 |
| 3,765,768 | 10/1973 | Budin et al. | 356/28.5 |
| 3,781,884 | 12/1973 | Horton | 343/7PF |
| 3,825,340 | 7/1974 | Debart | 343/17.2 R |
| 3,864,041 | 2/1975 | Long | 356/28.5 |
| 3,900,261 | 8/1975 | Wingate | 356/5 |
| 3,908,118 | 9/1975 | Micka | 364/551 |
| 4,005,936 | 2/1977 | Redman et al. | 356/5 |
| 4,059,052 | 11/1977 | Horton | 343 7.PF |

OTHER PUBLICATIONS

B. M. Horton, Pro of Ire., 5/1959—Vol. 47, p. 821,
Lang, Band 3, Regellose Vorgange, Veb Veslag, Technik, Berlin, p. 339.
Wang, Appl. Phys. Lett., vol. 20, No. 9, 1 May 1972.

FOREIGN PATENT DOCUMENTS 2012946 10/70 Germany.
2374652 7/78 France.

Primary Examiner—S. C. Buczinski
Attorney, Agent, or Firm—Charles L. Rubow

[57] ABSTRACT

Range and speed measuring equipment is disclosed including a laser transmitter for transmitting laser pulses of a noise modulated carrier frequency toward a target. Return pulses are received by a receiver including a photodetector for mixing the return pulses with a reference signal. The photodetector output signal is supplied to a frequency discriminator or a frequency counter whose output is averaged to indicate range. Noise modulators entirely external to and partially incorporated within the laser oscillator are shown. Means are shown both for deriving the reference signal from the transmitted pulses and for producing the reference signal with a reference oscillator.

14 Claims, 2 Drawing Figures

RANGE AND SPEED MEASURING EQUIPMENT WITH NOISE FREQUENCY MODULATED TRANSMITTER

BACKGROUND OF THE INVENTION

The present invention relates generally to range and speed measuring equpiment and, more particularly, to laser range and speed measuring equipment of the type utilizing a noise modulated laser signal and means for mixing signals returned from a target with a reference signal.

An aircraft radar altimeter with a transmitter frequency modulator controlled by a noise-frequency generator is described in Lange, "Signale und Systeme, Band 3-Regellose Vorgänge," *VEB Verlag Technik*, Berlin 19, pp. 339–342, and in Horton, "Noise Modulated Distance Measuring Systems," IRE Vol. 47, p. 821 (May 1959). The signal produced by the noise-frequency generator is supplied via an RC form filter and a receiver mixer stage to which a limiter with subsequent linear discriminator is connected via an audio frequency amplifier. Part of the energy radiated by the antenna is immediately and without delay fed into the mixer stage by the receiver antenna to be used as the oscillator voltage for the mixer stage (homodyne receiver). Measuring equipment of this type is characterized in that its sensitivity for distance variations is greatest at short distances, and is largely unaffected by the characteristics of the measuring path, especially with respect to signal attenuation.

SUMMARY OF THE INVENTION

The present invention is a high resolution range and/or speed meter comprising a laser transmitter with an internal or external modulator for noise frequency modulating a laser pulse transmitted toward a target. A corresponding pulse reflected from the target is optically correlated with a reference pulse which is either derived directly from the transmitted pulse or is supplied by a reference oscillator. Means is included for averaging the frequency difference between the reflected and reference signals to provide a signal proportional to range. An optical Doppler frequency shift signal may also be supplied for speed measuring purposes.

DESCRIPTION OF THE PREFERRED EMBODIMENTS

It should be pointed out initially that the combination of noise frequency modulation external to the resonator and homodyne receiver section on the one hand, and noise frequency modulation internal to the resonator and heterodyne receiver section on the other hand, as used here as examples for the embodiment, is by no means mandatory, and that other combinations of modulator location and type of receiver are also possible, and may even be especially advantageous under certain conditions.

Figure 1:
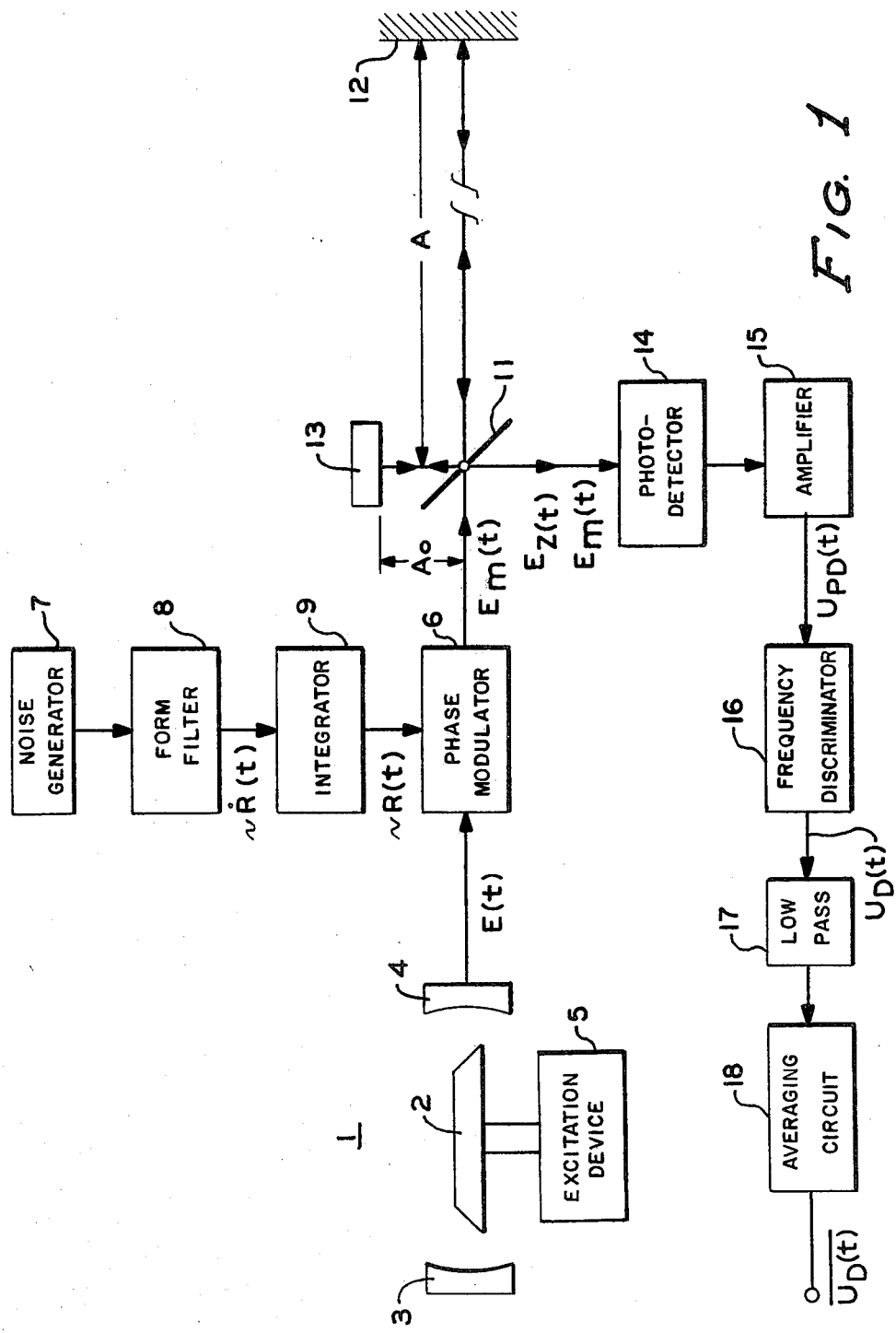
FIG. 1 is a block diagram of one embodiment of the applicant's laser range meter with a phase modulator separate from the laser resonator, and with a homodyne receiver section.

In FIG. 1, reference number 1 identifies a laser oscillator consisting of a laser amplifier 2, two reflectors 3 and 4, and an excitation device 5 for exciting the laser amplifier. Laser radiation E(t) generated by laser oscillator 1 is transmitted to an external phase modulator 6, where it is noise-frequency modulated. For this purpose, a noise generator 7 is connected to the modulation input of phase modulator 6 via a form filter 8 and an integrator 9. Modulation can be accomplished by any of several well known techniques. Such techniques utilize various phenomena, includes:

(a) the linear transversal or longitudinal photo-optical effect (Pockels cell) observed in certain crystals ($NH_4H_2PO_4$, $KH_2PO_4$, $KD_2PO_4$, and others), as well as the quadratic electro-optical effect (Kerr effect) observed in liquids (e.g. nitrobenzol) or in crystals;

(b) modulation of the geometrical length of the resonator, e.g. by control of the distance between the laser mirrors with the aid of piezo-electrical transducers;

(c) the acousto-optical effect, i.e., variation of the index of refraction of liquids by ultrasonic waves (Bragg cell);

(d) the magneto-optical effect, i.e., variation of the index of refraction of optically transparent materials under the influence of magnetic fields)

(e) the photo-elastic effect, i.e. variation of the index of refraction of glass and crystals in proportion to applied pressure forces; and (f) the Zeemann effect and the Stark effect, i.e. the effect of electric and magnetic fields on the laser-active medium as a result of the splitting and shifting of the atomic resonance frequency of the laser junction.

The phase-modulated laser pulse $E_m(t)$ passes through a beamsplitter mirror 11, and is reflected by the target 12 at a distance A mirror 11. Mirror 11 deflects the reflected pulse towards a reflector 13 positioned at a distance $A_o$ from the mirror. Reflector 13 reflects the measuring pulse $E_z(t)$ towards a photodetector 14 where it is optically heterodyned with a signal $E_m(t)$ derived from the phase-modulated laser pulse by mirror 11. This heterodyning of the measuring signal with a signal immediately derived from the transmitter signal is termed homodyne reception. The photodetector 14 is connected, through a wide-band amplifier 15, to a frequency discriminator 16 which receives the amplified output signal $U_{PD}(t)$ of the photodetector and supplies a frequency-dependent output signal $U_D(t)$ to a low-pass filter 17 with a limit frequency of, e.g., 10 Hz. The low-pass filter 17 connects to a circuit 18 designed for formation of the average value $$\overline{U_D(t)}.$$

It is assumed that the laser oscillator 1 radiates a longitudinal waveform $TEM_{OOq}$ with a (mean) signal frequency $\Omega_o = 2\pi\nu_o$ in continuous-wave (CW) mode. The electrical field strength of the laser signal, assuming that its wave front across the pulse cross section is plane, then is $$E(t,z) = E_o \cos[kz + \Omega_o t + \theta(t)] \quad (I)$$

where
- $\theta(t)$ is the instantaneous value of the phase of the (constant-amplitude) oscillator signal,
- $k = \Omega_o/c$ is the wave number, and
- $z$ is the distance from the transmitter oscillator along the pulse.

The phase modulator 6 is triggered by the noise frequency signal $\sim R(t)$ with a spectral distribution determined by a form filter, and impresses an artificial phase noise on the optical signal pulse. It is assumed here that the stochastic quantities $\theta(t)$ and $R(t)$ are representative of stationary and ergodic processes with a disappearing mean vaue. Especially, it is assumed that $\dot{R}(t)$ and/or $R(t)$ have a normal distribution, which can be provided by appropriate selection of the modulating noise generator.

A portion $E_m(t,z)$ of the modulated signal is directed immediately at the photodetector 14 by means of the beam splitter 11, where it optically heterodynes with the signal portion $E_z(t,z)$ reflected from the target 12. An electrical signal $U_{PD}$ with similarly stochastically varying frequency then appears at the output of the photodetector 14.

Equations for the electrical field strengths in the receiving plane of the photodetector are as follows:

$$E_m(t) = E_m \cos[\Omega_o t + \theta(t) + R(t) + k z_m] \quad \text{(II)}$$

$$E_z(t) = E_z \cos[\Omega_o t + \theta(t-\tau) + R(t-\tau) + k z_z] \quad \text{(III)}$$

where $z_m$, $z_z$ are the lengths of the optical paths of the respective pulse components, and $\tau$ is the additional travel time of the target signal.

Equation (III) assumes an ideally undisturbed transmission channel for the target pulse, i.e. it does not account for any additional amplitude and phase modulation.

The electrical signal at the output of the photodetector 14, thus, is $$U_{PD} = \{K_{PD} \tfrac{1}{2} \overline{E_m^2} + \tfrac{1}{2}\overline{E_z^2} + E_m E_z \cos[kc\tau + \theta(t) + R(t) - \theta(t-\tau) - R(t-\tau)]\} \quad \text{(IV)}$$

The formula for the instantaneous frequency of the beat signal is as follows:

$$\omega_{mz}(t,\tau) = \left| \frac{d}{dt} \Delta\theta(t,\tau) + \Delta R(t,\tau) \right| \quad \text{(V)}$$

with $\Delta\theta(t,\tau) = \theta(t) - \theta(t-\tau) = \int_{t-\tau}^{t} \dot{\theta}(t)dt$ (VI)

$\Delta R(t,\tau) = R(t) - R(t-\tau) = \int_{t-\tau}^{t} \dot{R}(t)dt$ (VII)

or, in an equivalent representation:

$$\omega_{mz}(t,\tau) = |\omega_m(t) - \omega_z(t)| \quad \text{(VIII)}$$
with $\omega_m(t) = \dot{\theta}(t) + \dot{R}(t)$ (IX)
$\omega_z(t) = \omega_m(t-\tau) = \dot{\theta}(t-\tau) + \dot{R}(t-\tau)$ (X)

where $\omega_m, \omega_z$ = instantaneous frequency variations of the modulator or target pulse from the (mean) signal frequency $\Omega_o$ of the laser light. Applicable equations are:

$$E_m(t) = E_m \cos[\Omega_o t + \int \omega_m(t)dt] \text{ and} \quad \text{(XI)}$$

$$E_z(t) = E_z \cos[\Omega_o t + \int \omega_z(t)dt]$$

Since the frequency-modulated signals $\dot{R}(t)$, $\dot{\theta}(t)$, in accordance with the assumption, have a statistical distribution with a mean value $\bar{\dot{R}} = \bar{\dot{\theta}} = 0$, the time-average value of the instantaneous frequency variation goes to zero $$\overline{\omega_m(t)} = \lim_{T \to \infty} \tfrac{1}{2} T \int_{-T}^{T} \omega(t)dt = 0 \quad \text{(XII)}$$

and the following equation applies for the scatter $\sigma_{\omega m}^2$ of the frequency variations:

$$\sigma_{\omega m}^2 = \overline{[\omega_m(t)]^2} \quad \text{(XIII)}$$

Similar statements apply also for the statistical distribution of the signal frequencies $\omega_z(t) = \omega_m(t-\tau)$ and $\omega_m(t,\tau) = \omega_m(t) - \omega_m(t-\tau)$.

The frequency discriminator 16 delivers the output signal $$U_D = K_D \omega_{mz}(t,\tau). \quad \text{(XIV)}$$

Due to the stochastic modulation of the laser light, variations of the discriminator output signal are observed with an RMS time-average value of $$\overline{[U_D(t,\tau)]^2} \sim \overline{[\omega_{mz}(t,\tau)]^2} = 2[\Phi_{\omega m}(0) - \Phi_{\omega m}(\tau)] \quad \text{(XV)}$$

where $\Phi_{\omega m}(\tau)$ is the auto-correlation function (ACF) of the frequency variation of the stochastically modulated laser light.

By the introduction of the normalized ACF $$\Phi^*_{\omega m} = \Phi_{\omega m}(\tau)/\Phi_{\omega m}(0) \quad \text{(XVI)}$$

and of the scatter $\sigma_{\omega m}^2$ (square of the effective value of the frequency variation of $\Omega_o$) in accordance with equation (XIII)

$$\sigma_{\omega m}^2 = \overline{[\omega_m(t)]^2} = \Phi_{\omega m}(0) \quad \text{(XVII)}$$

the following results from equation (XV):

$$\overline{[\omega_{mz}(t,\tau)]^2} = 2[\sigma_{\omega m}^2(t)]\{1 - \Phi^*_{\omega m}(\tau)\} \quad \text{(XVIII)}$$

In the following, it is assumed that the beat frequency $\omega_{mz}$, just like its components $\dot{R}(t)$, $\dot{R}(t-\tau)$ represents a Gaussian process with a disappearing mean value. It is well known that the equation for the relation between the effective value $$\tilde{u} = \sqrt{\overline{u^2(t)}}$$

and the time-average value of the value of a normally-distributed signal u(t) with a mean value of zero is as follows:

$$\frac{\bar{u}}{\overline{|u(t)|}} = \sqrt{\frac{\pi}{2}} - 0.798 \qquad \text{(XIX)}$$

Thus, the square of the effective value of the beat frequency variations becomes $$\overline{[\omega_{mz}(t,\tau)]^2} = \frac{\pi}{2} \overline{(|\omega_{mz}(t,\tau)|)^2} \qquad \text{(XX)}$$

By substitution of this relation in equation (XVIII), we arrive at $$\overline{|\omega_{mz}|} = \frac{2}{\sqrt{\pi}} \sigma\omega_m \sqrt{1 - \Phi^*\omega_m(\tau)} \qquad \text{(XXI)}$$

It is obvious that $$\overline{|\omega_{mz}|}$$

as the time-mean average of the absolute frequency differential $|\omega_m - \omega_z|$ per FIG. 1 can be measured directly because there are only electrical signal frequencies of the amount of the instantaneous frequency variations of the laser signals at the output of the detector 14 due to the homodyning of the laser pulses. The signal supplied by the averaging circuit 18 thus is $$\overline{|U_D(t)|} = K_D \overline{|\omega_{mz}(t)|} \qquad \text{(XXII)}$$

which is directly proportional to the left side of equation (XXI).

With $$\tau = 2A/c + 2A_o/c \qquad \text{(XXIII)}$$

where A and $A_o$ equal the distance of target 12 reflector 13 respectively from the point of intersection of the reflected laser pulses and the beam splitter mirror 11, it follows that the unknown target distance A from equation (XXI) is $$A = \frac{c}{2} \ln \{\Phi^*\omega_m(\tau)\} - A_o \qquad \text{(XXIV)}$$

where $$\Phi^*\omega_m(\tau) = 1 - \frac{\pi}{4} \frac{(\overline{|\omega_{mz}|})^2}{\sigma\omega_m^2} \qquad \text{(XXV)}$$

Equations (XXIV) and (XXV) or (XXI) define the measurement equations for the laser range meter with stochastic frequency modulation and homodyne heterodyne reception.

All these equations indicate that the unknown target distance A can be determined if the characteristic of the autocorrelation function $\Phi_{\omega^*m}(\tau)$ and the scatter $\theta_{\omega 2m}$ of the frequency variations of the laser light are known and the distance $A_o$ of reflector 13 from the beam-splitter mirror 11 has a predetermined value. The value $$\overline{|\omega_{mz}|}$$

represents here the so-called Horton's anti-correlation function /2/.

Figure 2:
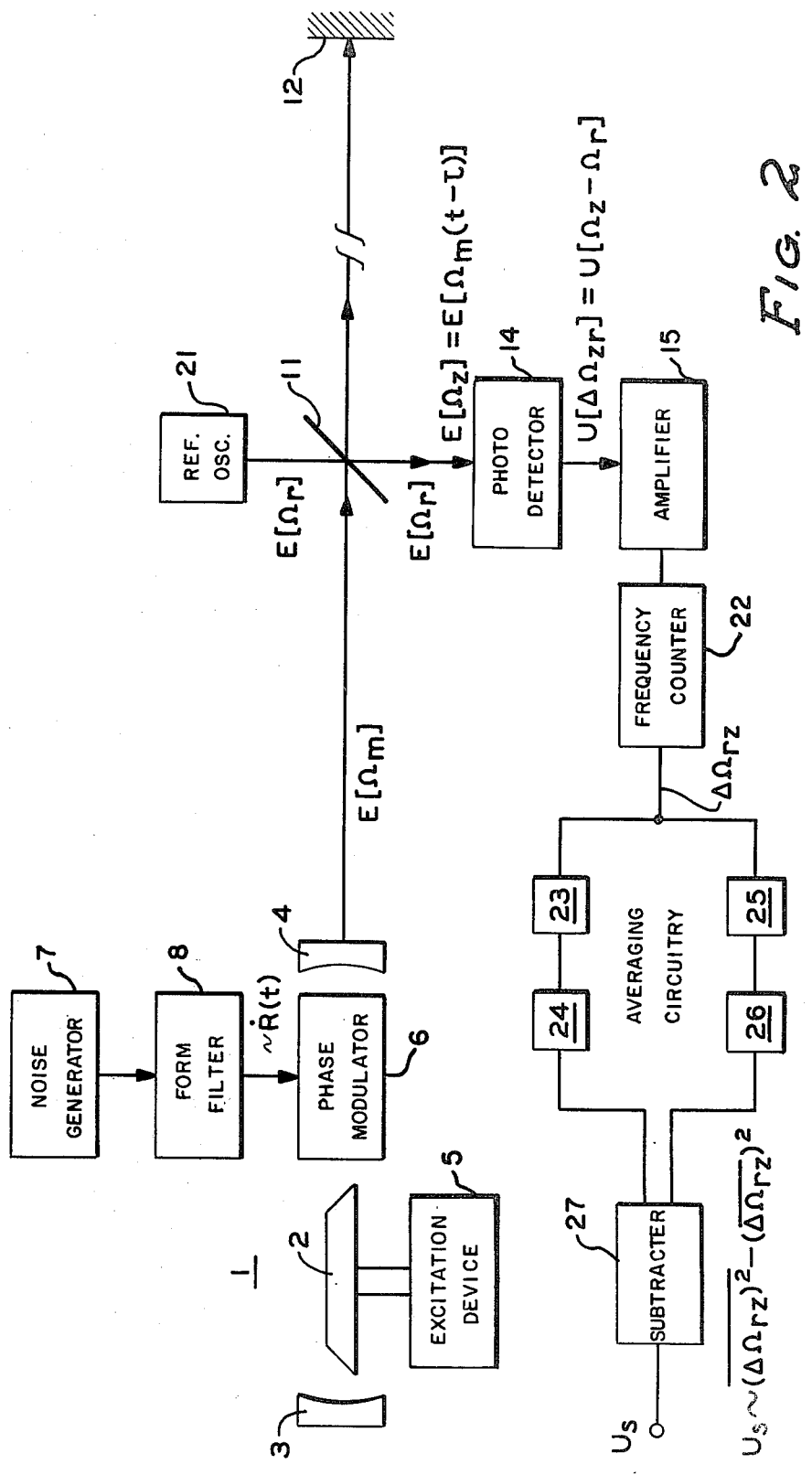
FIG. 2 is a block diagram of an alternative embodiment of a laser range meter with a phase modulator combined with the laser resonator, and with a heterodyne receiver section.

In the embodiment according to FIG. 2, the phase modulator 6 is arranged within the laser resonator 2,3,4. Connected to the input of the phase modulator, via a form filter 8, is again a noise-frequency generator 7. Since, in the case of the resonator-internal noise frequency modulation, phase modulation is tantamount to frequency modulation of the laser light, the integrator 9 is not required here. In this embodiment, the receiver section operates on the heterodyne principle, and is equipped for this purpose with a reference oscillator 21 which radiates its signal $E[\Omega_r]$ through the beam-splitter mirror 11 onto the photodetector 14. The noise-frequency-modulated output signal $E[\Omega_m]$ of the transmitter also passes through the beam-splitter mirror 11 to be reflected by the target 12. Mirror 11 deflects it to the photodetector 14 where it is heterodyned with the signal of oscillator 21. The following expressions describe the relationships of the unmodulated signal frequency $\Omega_s$ of the transmitter oscillator, its modulated signal frequency $\Omega_m$, the signal frequency $\Omega_r$ of the reference oscillator, and the beat frequencies $\Delta\Omega_{rz}$ and $\Delta\Omega_{sr}$ derived therefrom:

$$\Omega_r = \Omega_s + \Delta\Omega_{sr} \qquad \text{(XXVI)}$$

$$\Omega_m = \Omega_s R(t) \qquad \text{(XXVII)}$$

$$\Delta\Omega_{rz} = \Delta\Omega_{sr} + R(t - \tau), \Delta\Omega_{sr} = \Omega_s - \Omega_r \qquad \text{(XXVIII)}$$

Via a wide-band amplifier 15, a frequency counter 22 is connected to the photodetector, and this is followed by averaging circuitry consisting of two parallel signal channels and a subsequent subtracter 27. In one signal channel, the frequency counter 22 is followed by a squarer 23 and then by an averaging circuit 24. In this channel the beat frequency signal $\Delta\Omega_{rs}$ is first squared, and then the average value $(\overline{\Delta\Omega_{rz}})^2$ is formed. In the other channel, the frequency counter is followed first by an averaging circuit 25 and then by a squaring stage 26, which first forms the average value $\overline{\Delta\Omega_{rz}}$ of the beat frequency signal. This signal is subsequently squared to arrive at the $(\overline{\Delta\Omega_{rz}})^2$ signal. The subtracter 27 then forms the difference of the RMS signals present at the output of the two signal channels, i.e.

$$U_S = \overline{(\Delta\Omega_{rz})^2} - (\overline{\Delta\Omega_{rz}})^2 \qquad \text{(XXIX)}$$

Thus, equation XVIII provides information on the relation between the normalized autocorrelation function ACF and the scatter if the relation $$\overline{[\omega_{mz}(t,\tau)]^2} = \overline{(\Delta\Omega_{rz})^2} - (\overline{\Delta\Omega_{rz}})^2$$

is substituted on the left-hand side of the equation. This equation describes the measuring characteristic of the noise-frequency-modulated laser range meter using the heterodyne receiving system.

To obtain a signal-to-noise ratio favorable for a high degree of immunity from disturbance for the laser range meter, it is advisable to increase the output of the noise-frequency generator to the point where the electro-optical modulator 6 is modulated to the limits of its linear range and a high modulation power $P_R$ is available. The signal-to-noise ratio can also be increased by the use of a positively frequency-stabilized laser oscillator with resonator-external modulator (FIG. 1) which reduces the disturbance power $P_O$ of the natural frequency noise of the laser light. Further, the signal-to-noise ratio can also be increased if the form filter 8 in the modulating channel provides a spectral distribution of the signal R(t) which permits a selective filtering of the modulation information $\Delta_\tau \dot{R}$ in the receiving channel by means of the filter 17. A precondition therefor could be that the spectral distribution $S_{\dot\theta}(\omega)$ of the disturbance power, i.e. the spectrum of the natural frequency modulation of the laser light be known. To obtain a favorable signal-to-noise ratio for the laser light, it is advisable for the form filter 8 in the modulating channel to have a band-pass characteristic to provide for a modulated noise-frequency power output within a limited frequency band. If a sufficiently high lower cutoff frequency is selected for this band-pass filter which leaves the disturbance-power peak outside the filter band-pass region, then an appropriately matched filter 17 in the receiving channel will provide a favorable signal-to-noise ratio. If the center frequency of the filter is sufficiently high, only a small percentage of the disturbance power will be within the filter band-pass region.

A high signal-to-noise ratio can be attained if the 3-dB bandwidth $\Delta\Omega$ of the laser light is sufficiently narrow. To this end, it is advisable to use a positively frequency-stabilized laser. The signal-to-noise ratio improves with increasing center frequency $\Omega_m$ of the band-pass filter and is almost completely independent of its bandwidth $\Delta\omega_m$. It is of advantage if the ratio of the noise-frequency bandwidth $\Delta\omega_m$ to the bandwidth $\Delta\omega$ of the unmodulated carrier frequency is chosen as high as possible. In any case, the use of a band-pass filter as the form filter 8 is here much more advantageous than the low-pass form filter used in accordance with the state-of-the-art in a microwave range meter with noise-frequency modulation. Use of low-pass filtered noise permits precise measurement of the distances of very near objects. In the case of band-pass filtered noise, however, the resolution increases with increasing target distance to reach a maximum with the first zero-digit of the autocorrelation function.

An increase of the unambiguity range, and thus of the maximum target distance $A_{max}$ can be realized by the use of a measuring system employing two or more filters with different center frequencies $\omega_{m1}, \omega_{m2}, \ldots$ in the modulating ($8_1, 8_2, \ldots$) and in the receiving ($17_1, 17_2, \ldots$) channel. The filters are connected into the channel either in time sequence or in parallel, and the corresponding value $$|\omega_{mz}|_1, |\omega_{mz}|_2, \ldots$$

of the output signal determined.

If the target distance is larger than $A_{max}$, a sequence of possible $\tau$-values $\tau_{11}, \tau_{12}, \ldots$ and $\tau_{21}, \tau_{22}, \ldots$ respectively, results for each value from the ambiguity of the auto-correlation functions $\Phi_{\omega m1}, \Phi_{\omega m2}, \Phi_{\dot R1}, \Phi_{\dot R2}, \ldots$ However, there will be one measurement value that is present in all sequences; this is the measurement result.

With respect to the selection of the internal or external modulation method, it should be stressed that for a given frequency swing, comparatively low modulation voltages e.g. in the order of magnitude of some 10 volts are required in the case of internal laser modulation, as compared to some $10^3$ volts in the case of external modulation. However, for all internal-modulation methods, the modulating frequency or the modulation bandwidth, respectively, are subject to certain upper limits because of the high quality of the laser resonator. Conversely, in the case of external modulation, the bandwidth that can be attained is primarily determined by the design of the modulator. Using electro-optical crystals, limiting frequencies in the order of magnitude of $10^9$ Hz can be attained. It should be noted, however, that electro-optical modulators have not only an upper, but often also a lower limit frequency.

With respect to the beat-frequency system on the receiver end, it should be noted that the equipment requirements for the heterodyne system are higher than for the homodyne system especially because of the required reference oscillator and the more complicated evaluation electronics consisting of frequency counter and two-channel averaging circuitry. Also, frequency shifts due to target motions may have an important influence on the measurement results. In the case of heterodyne reception, the prosign of the resultant Doppler frequency may be lost due to the value-formation process, whereas the heterodyne system permit the determination of value and prosign of the Doppler shift if e.g. the signal $\overline{\Delta\Omega_{rz}}$ is picked off at the output of the averaging circuit 25. Applicable formula for the Doppler shift is $$\Delta\Omega_d = \overline{\Delta\Omega_{rz^*}} - \overline{\Delta\Omega_{rz}} = \dot R(t-\tau) + \overline{\Delta\Omega_d} \tag{XXXI}$$

where $\overline{\Delta\Omega_{rz}}^*$ is the actual value, and $\overline{\Delta\Omega_{rz}}$ is the desired value of the time-averaged beat frequencies. Of advantage is that, in the case of the heterodyne system, the output signal of the subtracter 27 is not compromised by the Doppler shift $\Delta\Omega_d$, and thus does not require correction. This can be seen from equation XXX.

The embodiments of the invention in which an exclusive property or right is claimed are defined as follows:

1. A laser range meter of the type including a laser transmitter for transmitting modulated radiation toward a target, reference signal generation means for producing reference radiation, and a receiver for receiving radiation reflected by the target, said receiver including a mixing unit for mixing the received radiation with the reference radiation, said receiver being operable to produce an electrical signal indicative of the frequency difference between the received radiation and the reference radiation, wherein the improvement comprises:

modulator means for noise modulating the frequency of the transmitted radiation;

a photodetector connected to receive the reference radiation and at least a portion of the received radiation, said photodetector serving as the mixing unit; and averaging means connected to said photodetector for receiving the electrical signal and providing an output signal indicative of target range.

2. The range meter of claim 1 wherein said modulator means includes a noise generator and a form filter.

3. The range meter of claim 2 wherein said modulator means is located external to the laser transmitter.

4. The range meter of claim 2 wherein said modulator means includes a phase modulator located internal to the laser transmitter.

5. The range meter of claim 2 wherein said averaging means includes a frequency discriminator.

6. The range meter of claim 2 wherein the reference radiation is derived from the transmitted radiation by means of a beam splitter.

7. The range meter of claim 6 wherein a reflector is located a predetermined distance from said beam splitter and said beam splitter and reflector are positioned so as to cooperate to transmit reflected radiation to said photodetector.

8. The range meter of claim 7 wherein the reference radiation is transmitted to said photodetector via said beam splitter and said reflector.

9. The range meter of claim 2 and 8 wherein said averaging means comprises:
a filter matched to said form filter;
a frequency discriminator; and
an averaging circuit.

10. The range meter of claim 9 wherein the output signal of said form filter is supplied through an integrator.

11. The range meter of claim 5 wherein the electrical signal produced by said photodetector is supplied to said frequency discriminator through a selective amplifier.

12. The range meter of claim 2 wherein:
the reference radiation is generated by a reference oscillator; and
the electrical signal produced by said photodetector is supplied to a frequency counter.

13. The range meter of claim 2 or 12 wherein the output signal of said frequency counter is supplied to averaging circuitry comprising:
a first averaging circuit followed by a first squarer connected to form a first channel; and
a second squarer followed by a second averaging circuit connected to form a second channel parallel with said first channel.

14. The range meter of claim 12 wherein the electrical signal produced by said photodetector is supplied to said frequency counter through a selective amplifier.

* * * * *